INVENTOR
ROBERT D. TOWNSEND, JR.

ATTORNEY

May 26, 1970 R. D. TOWNSEND, JR 3,513,910
SUBSEA PRODUCTION SATELLITE
Original Filed Jan. 19, 1966 4 Sheets-Sheet 3

INVENTOR
ROBERT D. TOWNSEND, JR.

*Alan G. Paul*
ATTORNEY

May 26, 1970  R. D. TOWNSEND, JR  3,513,910
SUBSEA PRODUCTION SATELLITE
Original Filed Jan. 19, 1966  4 Sheets-Sheet 4

INVENTOR
ROBERT D. TOWNSEND, JR.

Alan G. Paul

ATTORNEY

United States Patent Office 3,513,910
Patented May 26, 1970

3,513,910
SUBSEA PRODUCTION SATELLITE
Robert D. Townsend, Jr., Esher, Surrey, England, assignor to Mobil Oil Corporation, a corporation of New York
Original application Jan. 19, 1966, Ser. No. 521,745, now Patent No. 3,391,734, dated July 9, 1968. Divided and this application Sept. 25, 1967, Ser. No. 681,946
Int. Cl. E21b 33/035
U.S. Cl. 166—.5
9 Claims

ABSTRACT OF THE DISCLOSURE

This specification discloses a subsea production satellite having a watertight shell adapted to be secured to a marine bottom whereby production from submerged wells can flow into the shell. The satellite includes means for transporting personnel from the surface of the water to the satellite.

---

This invention is a division of application No. 521,745, filed Jan. 19, 1966, now U.S. Pat. No. 3,391,734, issued July 9, 1968.

This invention relates to a subsea production satellite system, having the satellite therefor anchored beneath the surface of a body of water at the site of a plurality of submerged wells. More particularly, the invention relates to a subsea production satellite having a travel chamber for transporting personnel between the surface and the satellite and having the wellheads for the plurality of submerged wells extending through the interior of the satellite.

Until now, bottom-supported above-surface platforms have been the principal mechanism for the installation and support of the equipment and services necessary for the fields. As the industry has developed over the years, it has extended its search for offshore fluid mineral deposits, for the most part, oil and gas from its birthplaces in the shallow coastal waters of California and the Gulf of Mexico into areas where, because of excessive water depth or other local conditions, the bottom-supported platform is neither as economically nor technologically feasible as in the Gulf of Mexico, where such facilities are rather commonplace. For purposes of this disclosure, the term "fluid minerals" is to be construed broadly to include minerals, such as gas and/or oil and also minerals adaptable to being mined by means of slurries, solvents, or any other similar states that may be tranpsorted through a production passage in a well and/or flowlines.

One solution is the installation of the production facilities on a floating platform, which could be maintained on location in the field by either a fixed multipoint mooring system of anchors and anchor lines or by a dynamic positioning system. The above-proposed solution requires continual maintenance and surveillance of the locatig system, as well as the associated problems and expense of maintaining multiple flexible hoses connecting the wells on the sea bottom with the continuously moving floating production platform, and the potential hazard to the hoses in the event of a failure of either the fixed mooring or dynamic positioning or locating systems.

It is, of course, technically possible to so modify and package the typical production equipment used for scheduling, measuring, testing, and otherwise performing the usual manipulations required on producing oil and gas wells, so that it could be installed below the water surface. Such packaging and modifying has already been accomplished, to a very limited extent for the much simpler problem of the wellhead for the subaqueous production of a gas or oil well. However, the cost has been quite high, usually doubling or tripling the expense of the underwater wellhead over its comparable above-water counterpart, because of the need to protect against the inimical undersea environment. Further, the problems of performing the necessary, if limited, service and maintenanance on this submerged equipment are substantial. Men cannot work as efficiently under water, where they are subject to the encumbrances of diving gear and the physiological problems of working under and breathing in the much higher than normal atmospheric pressures. Attempts have been made to replace man in this hostile environment by use of robotics, but these devices, at the present stage of their development, can only perform simple chores, and the cost of maintenance of the devices, themselves, is high. Further, they depend, for their efficiency of operation, on the effective use of underwater television, so that in turbid or muddy waters, where television is not effective, the robotic devices become almost useless. Thus, when all of the above disadvantages are considered with respect to the installation of complicated well testing and production equipment on the ocean floor, it can be seen that while perhaps such is technically feasible, it is only just barely so, and most certainly falls beyond the bounds of being economically feasible for all save a few very special situations.

Accordingly, it is an object of this invention to provide a subsea satellite for handling the production of a number of subaqueous wells at an offshore site.

It is another object of this invention to provide a subsea satellite having a travel chamber for transporting personnel between the surface and the satellite.

It is a further object of the invention to provide a subsea satellite which may be serviced without a diver or remote control devices.

Other objects and advantages of this invention will become readily apparent from the following description, when taken in conjunction with the accompanying drawings that illustrate useful embodiments in accordance with this invention.

Figure 2:
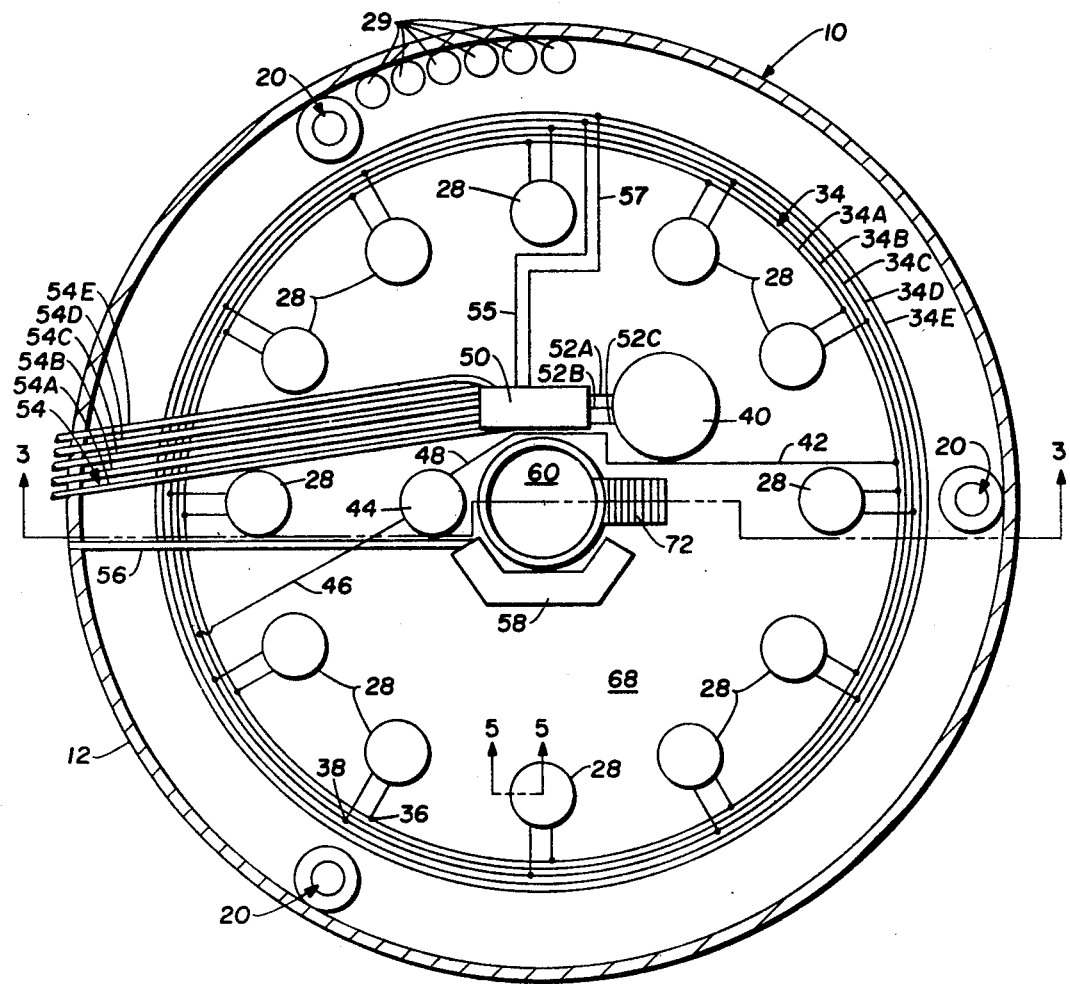
FIG. 2 is a schematic view through line 2—2 of FIG. 1 showing, in plan, a diagrammatic representation of the placement of the production apparatus within the subsea satellite.
Figure 3:
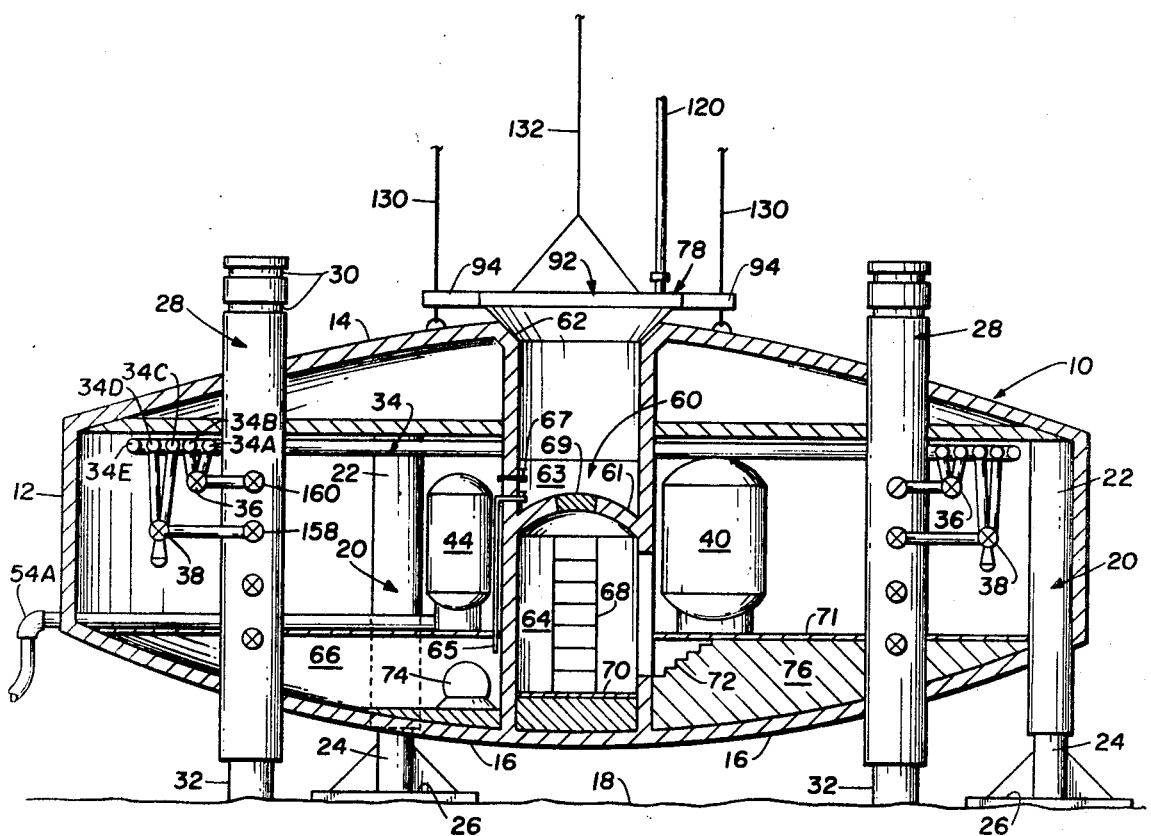
Figure 4:
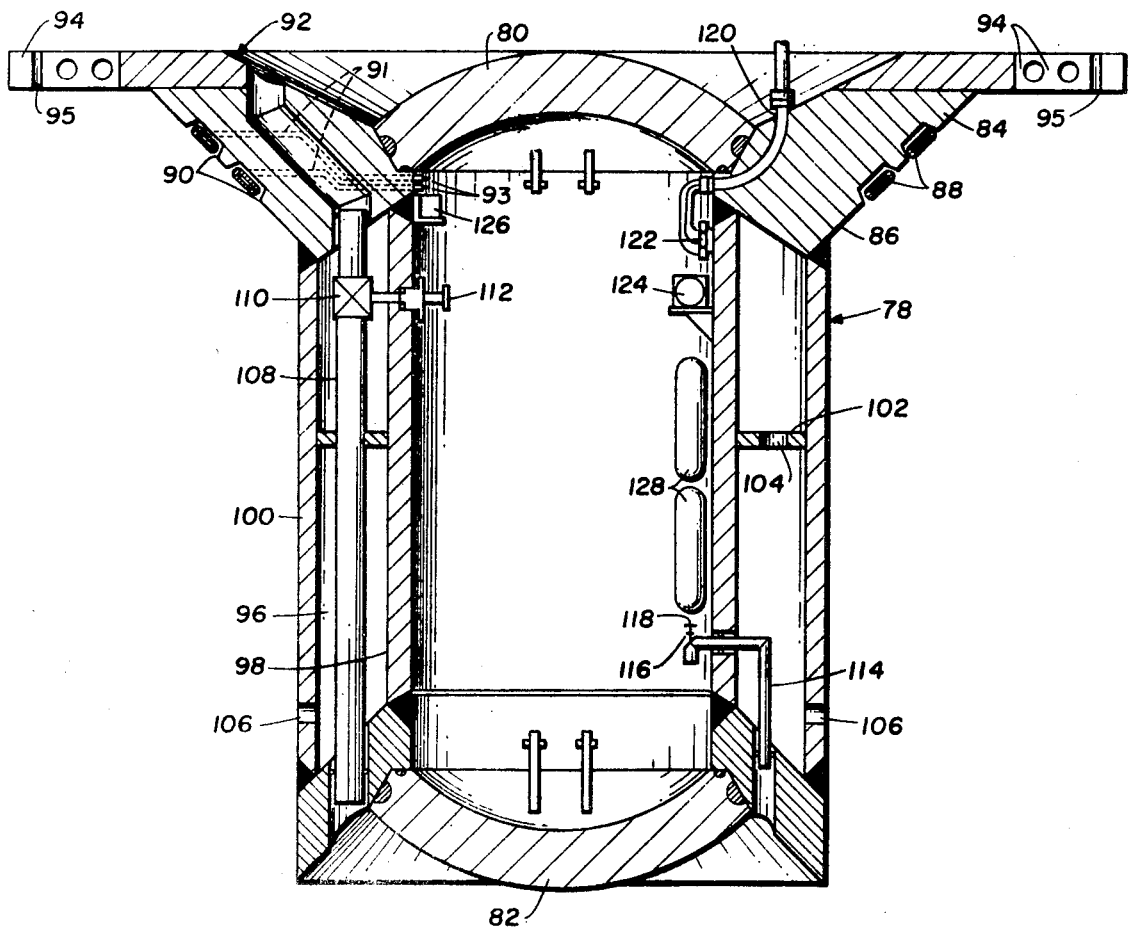

FIG. 3 is a cross-sectional view of the subsea satellite taken through line 3—3 of FIG. 2, with certain elements omitted for clarity further illustrating the placement of the production apparatus within the satellite and the manner in which the personnel travel chamber is sealed into an access trunk extending vertically through the satellite; and FIG. 4 is a cross-sectional view of the personnel travel chamber shown in FIG. 3.

Figure 1:
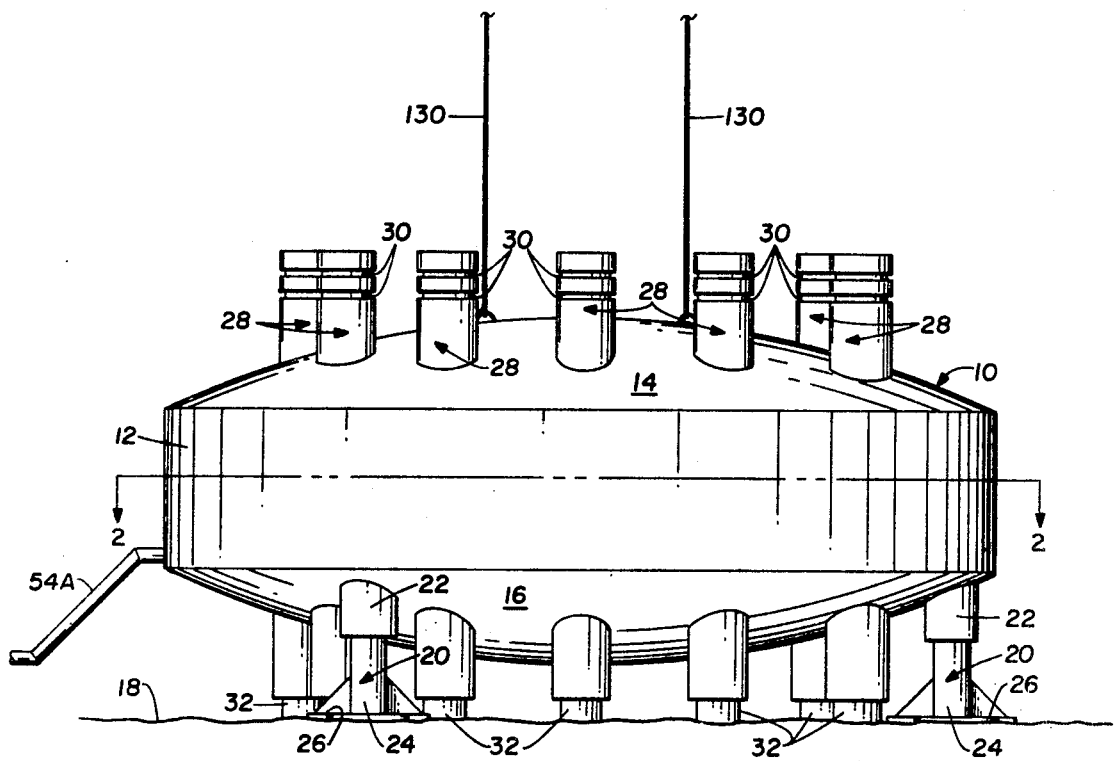
FIG. 1 is an elevational view of a subsea satellite of the present invention encompassing a circular configuration of subsea wellheads which extend therethrough.

Now looking at FIG. 1, which shows a bottom-installed satellite connected to wells therebeneath, a torus-shaped subsea production satellite, generally designated 10, is illustrated as a cylindrical shell 12 with upper and lower spherical heads 14 and 16, respectively. The satellite 10 is supported on the marine bottom 18 by means of leveling units, generally designated 20, each comprising an expansible chamber motor cylinder 22, extending through the lower spherical head 16, and a downwardly directed piston rod 24 terminating in a platelike foot 26. A plurality of wellhead cylinders, generally designated 28, extend vertically completely through the satellite 10 and have spaced circumferential grooves 30 on the outer surface of each near the upper ends thereof above the shell of the satellite 10. The cylinders 28 are welded to the upper and lower heads 14 and 16, respectively, so that the interior of the satellite remains watertight at all times. A conductor pipe 32, permanently fixed in each of the wellhead cylinders 28, depends therefrom, bridging the space between the satellite and the sea bottom and extends vertically into the formations beneath.

FIGS. 2 and 3 show the interior of the subsea satellite 10, with FIG. 2 showing, in particular, the placement of the leveling units 20, the wellhead cylinders 28, and the production equipment within the shell 12. The three leveling units 20 are arranged 120° apart in a circular pattern adjacent the cylindrical shell 12 to allow as much room inside the satellite 10 as possible for the production equipment, while the wellhead cylinders 28 are arranged in an inner circular pattern for accessibility. Storage bottles 29, containing nitrogen under high pressure, are stored along the walls of the satellite outward of the wellhead cylinders.

The wellhead cylinders 28 are tied into a circular manifold, generally designated 34, within the satellite 10, consisting of manifold lines 34A, 34B, 34C, and 34D. An auxiliary line 34E is also included in the circular manifold 34. Three-way, two-position valves 36 and 38 are connected via valves 160, 158 to the production passages and the well annuli, respectively, of the wellhead cylinders 28 (FIG. 3). The valve 36 of each wellhead cylinder, in a first position, connects the production passage of the respective well to a group separator 40 through the manifold line 34A and a group separator inlet line 42. In the second position of the valve 36, a test separator 44 is operatively connected to the production passage through the manifold line 34B and a test separator inlet line 46. The valve 38 of each wellhead cylinder connects the annulus of the respective well to a gas lift manifold line 34C. In the second position of the valve 38, the manifold line 34D, to be discussed later, is connected to the annulus of the well. A line 48 connects the outlets of the test separator 44 to the inlet of the group separator 40. The input side of a booster pump unit 50, adjacent the group separator 40, is connected thereto by the gas, oil, and water outlet lines 52A, 52B, and 52C, respectively. The output side of the booster pump unit 50 is connected to gas, oil, and water shipping lines 54A, 54B, and 54C, respectively, forming a part of a bundle of shipping lines, generally designated 54. While the booster pump unit 50 appears in schematic form as a single box, in actuality separate pumps or compressors would be required, one for each fluid, and each one would have to be driven by a separate variable speed drive, controlled by level or pressure sensors within the group separator 40. Shipping lines 54D and 54E carry dry gas and hydraulic oil from the storage facilities to the inlet of the booster pump 50 in the satellite. The outlets of the pump unit 50, connected to the dry gas and hydraulic oil shipping lines 54D and 54E, are connected to the manifold lines 34C and 34E by intermediate lines 55 and 57, respectively. A main electric power line 56 interconnects a power generator on a surface station with the satellite through a control, alarm, and data storage unit 58, operatively connected to all of the electric motors used with the subsea equipment.

In a production run the group separator 40 receives production from all of the wellheads through the manifold line 34A and separates the production into gas, oil, and water. The three-way, two-position valve 36 on each of the wellheads 28 is sequentially actuated, for a short time, to rotate it from the first position, in which it allows the production to flow into the group separator 40, into the second position in which it allows the production of the particular wellhead to flow into the test separator 44 for sampling the gas-oil-water ratio. The group separator 40 receives the bulk of the produced three-phase fluid from the manifold line 34A and permanently divides it into gas, oil, and water, the gas to be either flared at the surface or transported to the central storage facilities. The oil and water are pumped separately to the storage facilities where the oil is stored in tanks and the water is treated to remove contaminants and then pumped out into the sea, or sent back to the satellite to be used in water injection wells. The booster pump unit 50 raises the pressure in the shipping lines 54A, B, and C, which transport the gas, oil, and water to the storage facilities, where necessary, i.e., where the storage facilities are on the surface. The outputs of the test separator 44 are recombined and then fed into the group separator 40 through the interconnecting line 48. However, in the appropriate case, the separate oil, gas, and water from the test separator 44 can be fed directly into the shipping lines 54A, B, and C of the group separator 40. The information derived from the test separator 44, by means such as positive displacement meters (not shown), is directed into the control, alarm, and data storage unit 58 (FIG. 2).

During periodic inspections of the satellite 10, the information obtained from the test separator 44 and any other information gathering devices would be retrieved from the data storage portion of the unit 58. It is also feasible to continuously send the information to the surface as an electric signal through a cable, or instead store the information in the storage unit 58 until a release signal is received from the surface station. When personnel are not within the satellite it is advisable that rather than keeping breathable air within which could form an explosive mixture with any escaping gases, the breathable air be purged undiluted by flushing with the nitrogen kept within the satellite in the storage bottles 29. The nitrogen would itself be flushed and the satellite refilled with air when personnel are needed within the satellite 10.

The dry gas transported to the satelite through shipping line 54D can be injected into individual wells for gas lift procedures through the manifold line 34C and the two-position three-way valve 38. The manifold line 34D can be used for injecting other fluids as desired into the annuli of the wells. This may be packer fluids used to compensate for the hydrostatic pressure in a well or drilling mud to kill a well if this becomes necessary. Hydraulic oil may also be pumped down the well to power Kobe subsurface pumps (not shown). Workover fluids injected into the production tubing may be recirculated through the annulus, the manifold 34, and via a line from the satellite to the surface facilities, to reconditioning tanks at the source of the fluid. The high pressure hydraulic oil in the manifold line 34E can be tapped at points around the satellite to operate the appropriate hydraulic motors and controls.

The equipment is generally arranged around a central cylindrical access trunk 60 extending vertically through the satellite 10. The access trunk is partitioned by an arched, pressure-resistant bulkhead 61 into an upper travel chamber receiving portion 63, open to the sea through a coextensive aperture in the upper spherical head 14 of the satellite shell, and a lower or intermediate portion 64, closed off by the lower spherical head 16 of the satellite shell. A conical bevel 62 is formed at the intersection of the access trunk 60 and the upper spherical head 14 of the satellite 10. A valved drain line 65 connects a point in the upper portion 63 of the trunk 60, just above the bulkhead 61, with a waste sump 66 formed in a concrete ballast portion 76 in the lower end of the shell of the satellite 10. A further valved conduit 67 interconnects the upper portion 63 of the access trunk 60 with the interior of the satellite 10. A ladder 68 extends from a central sealable port or hatch 69 in the arched bulkhead 61 to a lower flooring or deck 70 of the access trunk 60. The lower deck or floor 70 of the access trunk is connected with an upper working deck 71 within the interior production area of the satellite surrounding the access trunk by a flight of stairs 72. A sump pump 74 is mounted in the satellite interior beneath the deck 71 in the waste sump area 66.

A travel chamber, generally designated 78, for transporting servicing personnel to the subsea satellite (FIG. 4), is constructed as a double-hulled cylinder with hinged spherical upper and lower ends or hatches 80 and 82, respectively, and a circumferential flange section 84, with a lower conically beveled face 86, fixed to the upper end thereof. A pair of inflatable sealing rings 88 are cemented within concentric circumferential grooves 90 in the lower face 86 and are connected by air passages 91, extending through the flange section 84, with releasable pressure fitting 93 mounted inside the chamber for inflating the rings 88 from within. In the alternative, elastically deformable solid sealing rings could be used. A hoisting yoke 92, comprising a pair of diametrically opposed guide arms 94, is rigidly fixed to the upper horizontal face of the flange section 84. A guide aperture 95 extends through the outer end of each guide arm 94. An integral buoyancy tank 96, formed between the inner cylindrical hull 98 and the outer cylindrical hull 100, is divided into upper and lower sections by a stiffening ring 102 which has a pluraility of interconnecting ports 104 extending therethrough. Buoyancy tank blowdown ports 106 are formed through the outer hull 100 at the lower end thereof. A bypass line 108 extends through the integral buoyancy tank 96, between the inner and outer hulls 98 and 100, respectively, to interconnect the aeras above the upper end 80 and below the lower end 82 of the travel chamber 78 through a shutoff valve 110 controlled by an hand actuator 112 situated within the inner hull 98. A pressure relief line 114 interconnects the interior of the inner hull 98 with the area below the lower end 82 of the travel chamber 78. The pressure relief line also has a shutoff valve 116 controlled by a hand actuator 118 located within the inner hull 98. Electric lines and air lines extend from the surface station into the travel chamber 78, entering by means of a sealed conduit 120, passing through the flange section 84 into the interior of the inner hull 98. The electric lines are connected within the inner hull 98, to a control panel and switchboard 122 for controlling the necessary apparatus connected with the travel chamber 78. Also within the travel chamber 78 are a high pressure bilge pump 124, a group of auxiliary storage batteries 126, and compressed air bottles 128.

Looking back to FIG. 3 it may be seen that a pair of tensioned guide lines 130 extend upwardly from the satellite's spherical head 14, on either side of the access trunk 60. The apertures 95 (FIG. 4) extending through the guide arms 94 of the hoisting yoke 92 are slidably entrained over these guide lines 130. Furthermore, a hoisting cable 132 is connected to the upper end of the travel chamber 78 and extends from there up to the surface station. With the travel chamber 78 settled in the upper portion 63 of the access trunk 60, the bulkhead 61 must be far enough below the lower end of the chamber to provide clearance for the two hinged hatches (the lower hatch 82 of the travel chamber and the hatch 69 in the access trunk bulkhead 61) to permit the two to clear each other when opening. The conduit 67, interconnecting the upper portion 63 of the access trunk 60 with the interior of the satellite 10, must be located so as to extend into the access trunk 60 below the lower end of the travel chamber 78 when the travel chamber is firmly seated in the trunk.

The travel chamber 78 is conducted from the surface station to the satellite 10, at the bottom, on the guide lines 130 which are connected at their upper ends to points on the surface station. The travel chamber 78 is conveyed from the satellite 10 to the surface station by means of the hoisting cable 132, although it is contemplated that the integral buoyancy tank 96 would play a large part in alleviating the strain on the cable. It is brought to the reader's attention that the upper removable end 80 serves as a hatch and is used to permit personnel to enter or leave the travel chamber 78 at the upper end of its journey without the necessity of lifting the travel chamber completely out of the water. By completely filling the buoyancy tank 96 with air from the compressed air tanks 128 and expelling the water therefrom, the chamber can be caused to rise quickly to the surface in an emergency. The compressed air can also be used to supply breathable air within the inner hull 98 if the air hose to the surface becomes crimped or severed.

By filling the buoyancy tank 96 with water, through the ports 106, the travel chamber 78 can be caused to descend back to the satellite 10 from the surface. The storage batteries 126 are also an emergency device, designed to take over if the electrical power delivered through the interconnecting electrical lines should fail or these lines be severed. As the travel chamber descends along the guide lines 130, into position within the access trunk 60, the sealing rings 88, set in the lower conically beveled face 86 of the flange section 84 on the upper end of the travel chamber 78, coact with the conical bevel 62 at the upper end of the access trunk 60 to seal the trunk at its upper end, the sealing rings 88 being inflated from within the travel chamber to permit them to conform more readily to and seal around any roughness in the mating surfaces. The bypass valve 110, controlling the bypass line 108, is held in an open position at this time so that as the chamber 78 settles into the access trunk 60 the displaced water can escape.

After the travel chamber is landed in the access trunk and is presumably sealed tight against the upper end of the access trunk 60, the bypass valve 110 would be closed. With the only water in the access trunk 60 being that under and around the travel chamber, and inasmuch as water is relatively incompressible, a quick opening of pressure relief valve 116 from within the travel chamber would immediately reduce the water pressure in the access trunk to the pressure existing in the travel chamber, if the travel chamber sealing rings 88 are sealingly properly. If water continues to flow through the valve 116, the presumption is that the sealing rings 88 are not holding and efforts to correct this must be made before the travel chamber lower hatch can be opened. In any event, it will be well nigh impossible to open the travel chamber lower hatch 82 until the pressure is equalized on both sides of it, i.e., the pressure below it brought to atmospheric, as that is the usual pressure within the travel chamber 78. The valved drain line 65 is operated by the personnel in the travel chamber 78, after they have opened the lower hatch 82, to drain the residual water trapped above the access trunk bulkhead 61. The sump pump 74 beneath the working deck 68 automatically controls the depth of the waste water within the sump or bilge section 66 and so would evacuate the residual water being dumped through the drain line 65.

The valved conduit 67 would be used by personnel within the travel chamber, after the bottom hatch 82 of the travel chamber 78 is opened, as a connection for a pressure gauge to check the internal pressure within the satellite before the hatch 69 into the latter is opened. There will undoubtedly be an indication of the satellite internal pressure transmitted to the surface production facility servicing the production satellite, but the gauge check would be made as a necessary precaution. The same or another connection could be used by the personnel in the travel chamber 78 to sample the atmosphere within the satellite 10 for combustible or deleterious gases before the lower hatch 69 into the satellite 10 is opened and the personnel enter therein.

What is claimed is:

1. A subsea production satellite for producing minerals from a plurality of independently spaced, submerged wells completed beneath the surface of a body of water, said satellite comprising:

a hollow, pressure-resistant, watertight shell adapted to be secured to the marine bottom in the vicinity of the plurality of wells;

a plurality of inlet means spaced one from the other on said shell, each of said inlet means being adapted to be connected to a respective submerged well to be produced when said satellite is in position on the marine bottom;

means, within said shell and connected to all of said inlet means, for monitoring the production from the plurality of spaced wells when the wells are connected to their respective inlet means;

means on said shell adapted to receive a submergible, personnel carrying means for conveying personnel from the surface of the body of water to said satellite; and means on said shell for allowing personnel to enter said shell from the personnel carrying means once the personnel conveying means has been received at said satellite.

2. The subsea production satellite of claim 1 wherein said means adapted for receiving a submergible, personnel carrying means comprises:

an access trunk defining a substantially vertical walled passage open at least at one end thereof adapted to receive the personnel carrying means therein.

3. A subsea production system for producing fluid minerals from at least one well submerged beneath the surface of a body of water, said system comprising:

(a) a subsea satellite having a hollow, pressure-resistant, watertight shell and being supported beneath the surface of said body of water on the marine bottom;

(b) means for monitoring the production of a well from within said satellite;

(c) a tubular access trunk being at least in part vertically disposed in said satellite;

(d) a travel chamber for transporting personnel from a point on the surface of said body of water to the interior of said satellite, said travel chamber including a tubular body adapted to be received within said tubular access trunk and a sealable hatch in said travel chamber, said tubular body of said travel chamber being of double wall construction with the area between the walls forming an integral buoyancy tank, and including means for controlling the buoyancy of said integral buoyancy tank whereby said travel chamber can be raised from said subsea satellite to said surface of said body of water by a buoyant force;

(e) means for selectively connecting said access trunk to the interior of said satellite whereby personnel in said travel chamber may enter directly into the interior of said satellite through said sealable hatch;

(f) means to guide said travel chamber from said point on the surface of said body of water into said tubular access trunk; and (g) means for releasably sealing said travel chamber in said access trunk.

4. The subsea production system of claim 3 further comprising means in said travel chamber for forming a fluid path between points in said body of water and said tubular access trunk when said travel chamber is received in said access trunk, said fluid path comprising a conduit extending through said travel chamber, a shut-off valve in said conduit, valve actuating means for operation of said shut-off valve, said valve actuating means extending into the personnel transporting portion of said travel chamber whereby personnel within said travel chamber can control said fluid path to equalize the pressure between the upper and lower ends of said travel chamber.

5. The subsea production system of claim 4 further including means in said travel chamber for equalizing the pressure between the interior of said travel chamber and said access trunk when said travel chamber is sealed in said access trunk, said means for equalizing the pressure comprising a conduit extending between the interior of said travel chamber and the exterior thereof, a shut-off valve in said conduit, and means for actuating said shut-off valve by personnel inside said travel chamber.

6. The subsea production system of claim 5 wherein said means for releasably sealing said travel chamber in said access trunk comprises a circumferential shoulder formed in the upper end of said access trunk, a circumferential flange section on the upper end of said travel chamber and having a face which is adapted to fit tightly against said shoulder, and means for releasably sealing said face against said shoulder whereby a watertight seal is formed when said travel chamber is received in said access trunk.

7. The subsea production system of claim 6 wherein said means for sealing said face to said shoulder comprises at least one elastically deformable, ring seal mounted in a groove in the face of said circumferential flange.

8. The subsea production system of claim 6 wherein said means for sealing comprises at least one expandable, ring seal mounted in a circumferential groove in the face of said circumferential flange and means for controlling the expansion of said expandable, ring seal by personnel within said travel chamber.

9. A subsea production satellite for producing minerals from at least one submerged well completed beneath the surface of a body of water, said satellite comprising:

(a) a hollow, pressure-resistant, watertight shell;

(b) means for monitoring the production of a well from within said satellite;

(c) a travel chamber access trunk in said satellite, said trunk defining a substantially vertically walled passage which is open at one end and is connected with the interior of said shell at its other end, said open end adapted to receive a travel chamber conveying personnel from said surface to said satellite;

(d) sealable port means movable between an open and a closed position in said access trunk below the level of the travel chamber when said travel chamber is received in said access trunk, said port means when in a closed position sealing said open end of said access trunk from said other end;

(e) means for draining that portion of said open end of said access trunk between the lowermost part of a travel chamber and said sealable port means when the travel chamber has been received in said open end of said access trunk; and (f) means for operating said means for draining, said operating means being located in said open end of said access trunk above said sealable port means whereby said means for draining is operable from outside said watertight shell while said sealable port means is in a closed position.

References Cited

UNITED STATES PATENTS 2,294,296  8/1942  Hansen _____ 114—16
3,063,507  11/1962 O'Neill et al. _____ 166—.5
3,353,364  11/1967 Blanding et al. _____ 175—6

FOREIGN PATENTS 160,865  4/1921  Great Britain

JAMES A. LEPPINK, Primary Examiner

U.S. Cl. X.R.

175—9